United States Patent

[11] 3,612,643

| [72] | Inventor | Morris Weber |
| | | Sherman Oaks, Calif. |
| [21] | Appl. No. | 844,358 |
| [22] | Filed | July 24, 1969 |
| [45] | Patented | Oct. 12, 1971 |
| [73] | Assignee | Hughes Aircraft Company |
| | | Culver City, Calif. |

[54] TARGET LOCATING SYSTEM
3 Claims, 4 Drawing Figs.

[52] U.S. Cl. ..................................... 350/6, 250/203, 350/16
[51] Int. Cl. .................................. G02b 17/00
[50] Field of Search ........................... 350/6, 7, 16, 285; 178/76; 250/203, 231 GY, 83.3 UV

[56] References Cited
UNITED STATES PATENTS

| 2,684,007 | 7/1954 | Newell | 350/16 UX |
| 2,966,591 | 12/1960 | McCartney | 350/6 UX |
| 3,118,650 | 5/1967 | Papp | 350/6 |
| 3,341,151 | 9/1967 | Kampinsky | 350/6 UX |
| 3,446,980 | 5/1969 | Meier | 350/16 X |

*Primary Examiner*—David Schonberg
*Assistant Examiner*—John W. Leonard
*Attorneys*—James K. Haskell and Walter J. Adam ABSTRACT: A receiving system including a mirror mounted on a pair of gimbals to direct light to a stationary detector, wherein the inner gimbal is driven from a drive shaft which rotates at twice the speed as the mirror and in the same direction. Gyroscopes and position transducers are mounted on the drive shaft.

PATENTED OCT 12 1971 3,612,643

INVENTOR.
MORRIS WEBER,
BY J. K. Haskell
ATTORNEY.

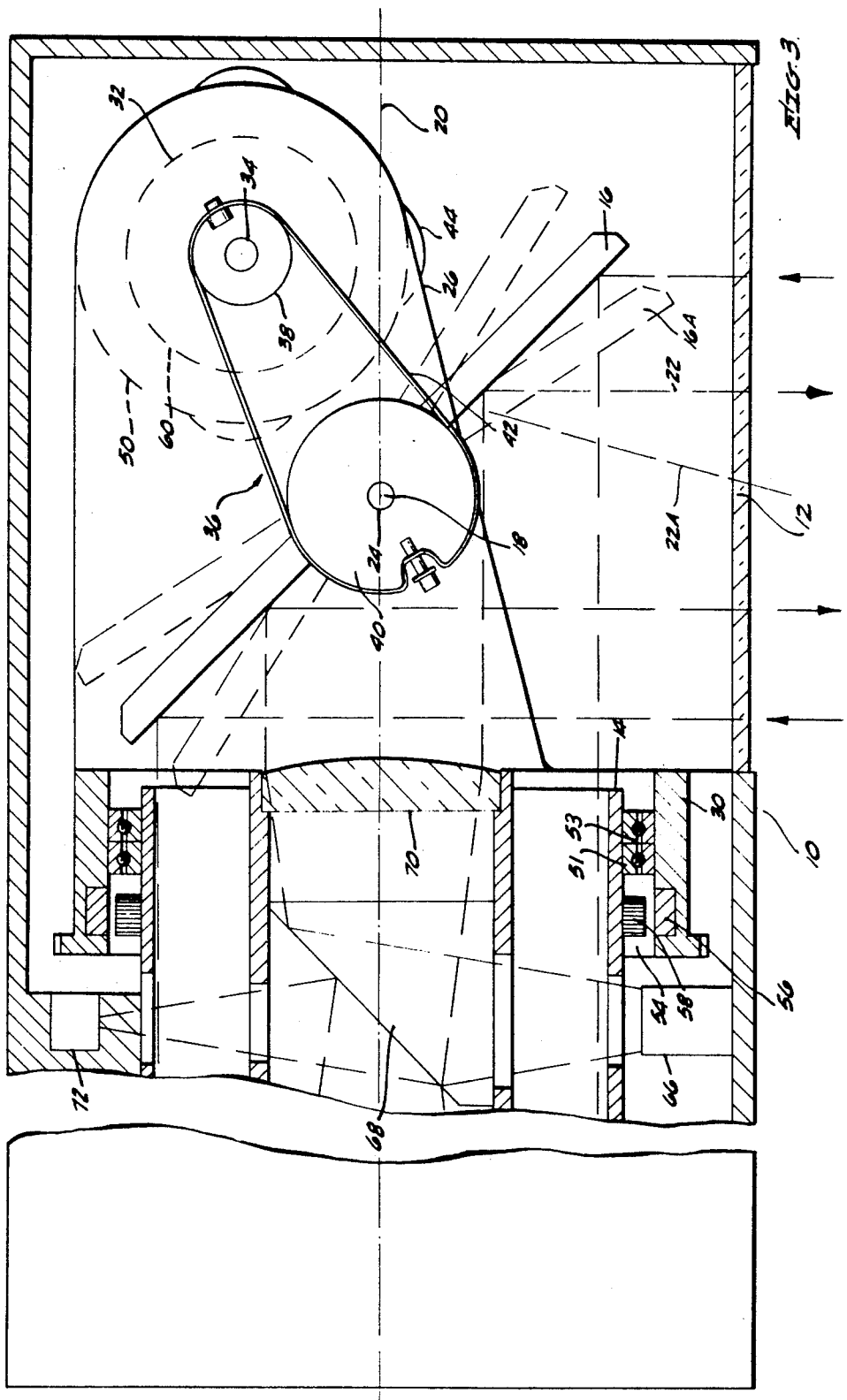

TARGET LOCATING SYSTEM

BACKGROUND OF THE INVENTION

1. Field of the Invention

This invention relates to target tracking apparatus for transmitters and receivers.

2. Description of the Prior Art

One type of receiving system employs a nominally stationary detector and a mirror for directing light or other radiation to the detector. The mirror is mounted on a pair of gimbals so it can rotate about two axes to direct light from a wide range of directions to the detector. In a space stabilized receiving system, the inner and outer gimbal are motor driven, and gyroscopes and position transducers are used to sense disturbances and drive the motors to cancel the disturbances.

The mirror has been driven either directly by a high-torque motor or by a low-torque motor through a large speed reduction gear train. Efforts have been made to reduce the weight of the motor and associated apparatus to a minimum to reduce the time required to rotate the mirror. Rotation of the mirror by the motor is employed to enable target search and tracking, as well as to compensate for disturbances.

OBJECTS AND SUMMARY OF THE INVENTION

An object of the present invention is to provide a tracking system of maximum stability.

Another object is to provide a compact and efficient target locating system.

In accordance with the present invention, a tracking system is provided which has maximum stability against disturbances. The system employs a mirror for deflecting light to a detector. The mirror is mounted for rotation about a first axis of rotation wherein the line of sight changes by twice the angle of rotation of the mirror, as well as a second axis wherein the line of sight changes in the same amount as the mirror rotates. For rotation about the first axis, the mirror is driven by a drive shaft that rotates at twice the speed and in the same direction as the mirror. A gyroscope and position transducer may be fixed to the drive shaft, the high inertia of the drive shaft and instruments carried thereon serving to stabilize the mirror against disturbances.

In one embodiment of the invention, the mirror is mounted on a mirror shaft and a band drive is used to couple the drive shaft to the mirror shaft so they rotate at a 2:1 ratio and in the same direction. A torquer motor has its armature fixed to the drive shaft and a pair of gyroscopes and pair of position sensors are mounted on the drive shaft. The high inertia of the drive shaft tends to maintain it at a predetermined orientation when the system is disturbed, and it drives the mirror at a speed that compensates for the disturbance so as to remain on target. Thus, even if no power were supplied to the motor, it would tend to maintain a constant line of sight in the presence of disturbances. Only a small amount of motor power is required, and the system tracks well even if there is a delay in energization of the motor.

The mirror and mirror drive are mounted on an outer gimbal structure that is rotatable mounted on the detector head, to enable mirror rotation about a second axis. The outer gimbal structure is driven by a large diameter direct drive torquer motor that has a permanent magnet field assembly fixed to the outer gimbal structure and an armature assembly fixed to the detector head. This allows use of the mass of the motor field assembly to help stabilize the mirror against disturbances that tend to pivot it around the second axis of rotation.

The novel features of the invention are set forth with particularity in the appended claims. The invention will best be understood from the following description when read in conjunction with the accompanying drawings.

BRIEF DESCRIPTION OF THE DRAWINGS

FIG. 3 is a sectional plan view taken on the lines 3—3 of FIG. 2; and

DESCRIPTION OF THE PREFERRED EMBODIMENTS

Figure 2:
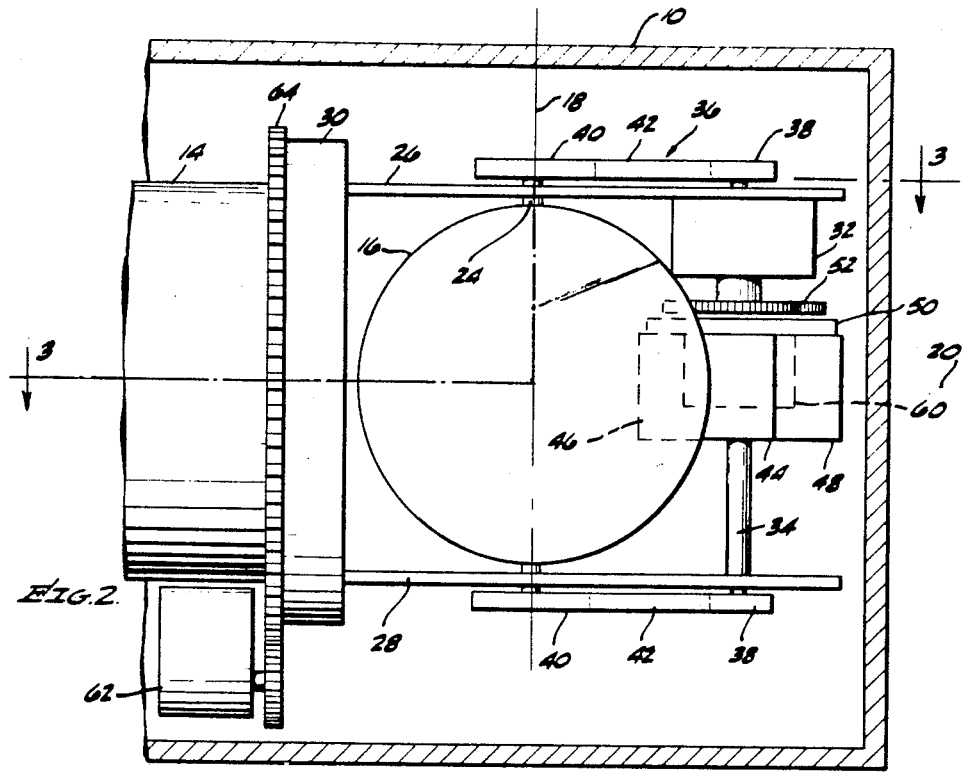
FIG. 2 is a sectional view taken on the lines 2—2 of FIG. 1.
Figure 1:
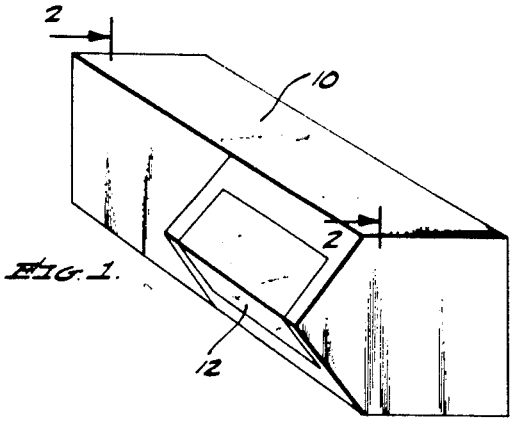
FIG. 1 is a perspective view of a transmitter-receiver system constructed in accordance with the invention.

The figures illustrate a transmitter-receiver system for use on tanks and other ground vehicles to track a target. The system includes a housing 10 with a window 12. A target can be illuminated by a laser within the housing which generates a beam that shines through the window at the target. The target can be sensed by a detector within the housing which receives light from the target that passes through the window. The system has a head 14 which includes a laser and a detector. It also includes a mirror 16 which reflects light from a variety of directions to the head or from the head to a variety of directions, these directions of transmission and detection generally referred to as the line of sight. The mirror is mounted for rotation about two axes, including an inner axis 18 to vary the azimuth of the line of sight and an outer axis 20 to vary the elevation of the line of sight. The head 14 is nominally stationary, or fixed in orientation, although it is subject to disturbances as the vehicle moves over the terrain. The line of sight of the system is space stabilized, to point in a fixed direction regardless of disturbances as the vehicle moves over rough terrain. In addition, the line of sight can be rotated, to track a moving target or to search for a target.

When the mirror rotates about the outer axis 20, the line of sight changes by the same angle as the mirror rotates. However, when the mirror rotates about the inner axis 18, which is perpendicular to the optical path extending from the mirror toward the head, the line of sight changes by twice the mirror rotation. Thus, for example, if the mirror 16, as shown in FIG. 3, rotates by about 10° to position 16A, the line of sight 22 rotates by 20° to position 22A. In a space stabilized system, the mirror 16 must be rotated by one-half of any angular disturbance of the system about the axis 18 to cancel the effect of the disturbance. Heretofore, such rotation has been generally performed by a torquer (low-speed, high torque) motor whose armature was fixed to the inner gimbal on which the mirror is mounted, or by a lower torque motor which was connected through a large ration speed reduction gear train to the inner gimbal. In order to effectively stabilize the mirror against disturbances, care had to be taken to minimize the moment of inertia of the motor armature and connecting gear train. Motor inertia was minimized to reduce the time required to rotate it and the mirror so as to cancel a disturbance.

In accordance with the present invention, a mirror driving mechanism is provided which employs the inertia of the motor armature to help stabilize the mirror. The mirror 16 is fixed to a mirror shaft 24 that serves as the inner gimbal, the mirror shaft being pivotally mounted on a pair of walls 26, 28. The walls 26, 28 are fixed to a ring 30 that is rotatably mounted on the nominally stationary head 14, the walls and ring serving as the outer gimbal of the mirror support. The mirror 16 can be pivoted about the inner axis 18 by rotatably driving the mirror shaft 24, and the mirror can be driven about the outer axis 20 by rotatably driving the ring 30 about the head 14.

The mirror shaft is driven by an inner torquer motor 32 whose armature is fixed to a drive shaft 34. The drive shaft is coupled by a band drive 36 to the mirror shaft 24. The band drive includes first pulleys 38 fixed to the drive shaft, second pulleys 40 fixed to the mirror shaft, and bands 42 that extend around them. The diameter of each pulley 40 is twice the diameter of each pulley 38 so that the drive shaft 34 turns twice as far as the mirror shaft; i.e., the drive shaft and mirror turn at a 2:1 ratio, respectively. The band drive causes the drive and mirror shafts to turn in the same direction. Of course, a cable or other flexible transmission member can be used instead of a band, as the band means for coupling the pulleys.

When the system is subjected to an angular disturbance about the inner axis 18, as when the vehicle hits a bump in the road, the drive shaft 34 tends to remain stationary, and therefore it rotates relative to the walls 26, 28 in a direction opposite to the disturbance. The drive shaft 34 turns the mirror in the same direction and by one-half the angle, which is the amount by which the mirror must be rotated to cancel the effect of the rotational disturbance. If the drive shaft 34 and apparatus fixed to it have a much higher moment of inertia than the mirror 16, and assuming negligible friction, then the mirror will be rotated in a direction and amount required to cancel disturbances of the system about the inner axis, without any motor power. The inner motor 32 can provide power to overcome friction and account for the appreciable inertia of the mirror. However, for a large drive shaft inertia, very little motor power is required. Furthermore, if there is a lag in power output of the motor after a disturbance is detected, this has a minimum effect since most of the compensation occurs automatically without motor power. The band coupling has substantially no backlash, and unlike a gear coupling, allows drive shaft and mirror rotation to occur in the same direction using a simple and low inertia coupling.

The inertia of the drive shaft 34 is further increased by the mounting of gyroscopes 44, 60 and a pair of position transducers 46, 48 on the drive shaft. The position transducers 46, 48, which may be potentiometers or shaft encoders, are fixed to a flange 50 on the drive shaft 34, but have armatures coupled to a gear 52 that is fixed to the housing of the inner motor 32 and therefore to wall 26. One of the position transducers and the gyroscope 44 are connected in a conventional feedback loop that drives the inner motor 32. When the system is locked onto a fixed target, the feedback loop drives the motor so as to maintain the drive shaft 34 and line of sight at a fixed angular position about the inner axis 18.

The ring 30, and the walls 26, 28 and all apparatus carried thereon, are rotatably supported on the head 14 by a pair of large diameter bearings 51, 53. The inner races of the bearings are fixed to the head while the outer races are fixed to the ring. A large diameter torquer motor 54 is used to drive the ring 30, the permanent magnet field assembly 56 being fixed to the ring 30 while the armature 58 is fixed to the outside of the head. The line of sight 22 changes by the same amount as the mirror rotates about the outer axis 20. Thus, the outer gimbal, which includes the ring and apparatus carried by it, has an inertia which tends to maintain the mirror at a fixed rotational position with respect to outer axis 20 to help resist disturbances. The additional inertia provided by mounting the permanent magnet field assembly 56 on the outer gimbal helps to stabilize the system. As in the case of the inner motor, the outer motor 54 makes corrections due to friction, as well as rotating the line of sight in tracking a moving target and searching for a target.

A gyroscope 60 for sensing angular disturbances of the outer gimbal is mounted on the flange 50 which is on drive shaft 34. A position transducer 62 (see FIG. 2) for sensing the rotational position of the outer gimbal is coupled to the outer gimbal by a large gear 64 thereon. If conditions permit, a large diameter position transducer can be mounted in a manner similar to that of the motor 54, with one element on the gimbal and one on the head, to utilize the transducer inertia to stabilize the outer gimbal.

As shown in FIG. 3, the system serves as both a transmitter and receiver. In transmitting, diverging light beams from a laser 66 are deflected by a prism 68, pass through a collimating lens 70, and are deflected by the mirror 16 into the line of sight direction. In receiving, light received through window 12 is deflected by mirror 16, and most of it passes into the head 14 through the space around the collimating lens. A concave mirror (not shown) in the head, reflects the light to prism 68 which deflects it to a light detector 72.

Figure 4:
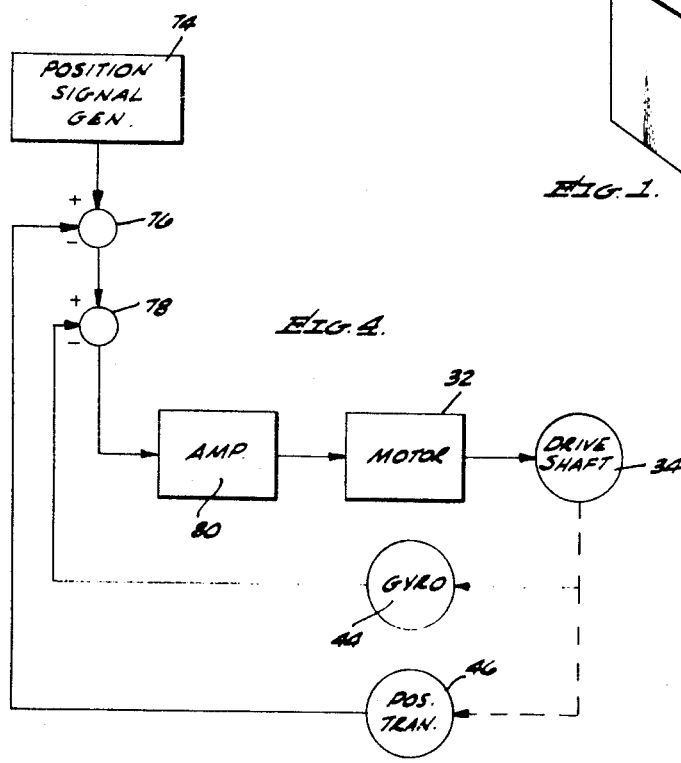
FIG. 4 is a simplified block diagram of one feedback loop of the system of FIG. 1.

A simplified diagram of a feedback loop for the inner gimbal is shown in FIG. 4. A position signal generator 74 provides an output voltage that varies in accordance with the desired line of sight angle about the inner axis. This signal passes through a first summing junction 76, second summing junction 78, and an amplifier 80, to the motor 32 to energize it and turn the drive shaft 34. The position transducer 46 on the drive shaft senses the position of the drive shaft and delivers a signal to summing junction 76. When the drive shaft has reached the commanded position, the output of transducer 46 equals the output of generator 74, and there is a zero output from summing junction 76. The gyroscope 44, which is also coupled to the drive shaft, has an output which is delivered to the summing junction 78 to correct for small disturbances. Thus, the feedback loop drives the drive shaft 34 so as to maintain a desired line of sight. However, the construction described above, makes the system largely self-stabilizing.

Thus, the invention provides a space stabilized system wherein the inertia of the gimbal-driving motors is utilized to help stabilize the mirror. Of course, many variations may be employed. For example, a prism can be used instead of mirror 16 as the mirror means that deflects light from the target into the optical path extending between the head and mirror means, or from this path towards the target.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A space stabilized system comprising:
 a head;
 an outer gimbal rotatably mounted on said head;
 mirror means rotatably mounted on said outer gimbal and having a first axis;
 a drive shaft rotatably mounted on said outer gimbal and having a second axis parallel to said first axis;
 motor means mounted on said drive shaft to rotate around said second axis;
 gyro means mounted on said drive shaft to respond to rate of movement around said second axis;
 position transducer means mounted on said drive shaft to respond to angular position around said second axis;
 means coupling said gyro means and said position transducer means to said motor means;
 and drive means having a first and a second rotating structure respectively mounted on said drive shaft and said mirror means, said drive means providing a two to one angular rotation ratio between said first and second rotating structures, said drive means rotating said mirror means and said drive shaft in the same direction.

2. The system described in claim 1 including:
 an outer torquer motor for rotating said outer gimbal, including a ring shaped permanent magnet field assembly fixed to said outer gimbal and a ring-shaped armature assembly fixed to said head at a position adjacent to said field assembly.

3. The system described in claim 1 wherein:
 said drive means comprises a first pulley mounted on said mirror means, a second pulley of one-half the diameter of said first pulley mounted on said drive shaft and band means extending between said first and second pulleys to couple them for rotation in the same direction.